(12) United States Patent
Bergvall et al.

(10) Patent No.: US 6,300,737 B1
(45) Date of Patent: Oct. 9, 2001

(54) ELECTRONIC BORDERING SYSTEM (75) Inventors: Bengt Allan Bergvall, Huskvarna; Ulf Petersson, Tollered, both of (SE)

(73) Assignee: Aktiebolaget Electrolux, Stockholm (SE)

( * ) Notice: Subject to any disclaimer, the term of this patent is extended or adjusted under 35 U.S.C. 154(b) by 0 days.

(21) Appl. No.: 09/508,950

(22) PCT Filed: Sep. 15, 1998

(86) PCT No.: PCT/SE98/01635

§ 371 Date: Mar. 17, 2000

§ 102(e) Date: Mar. 17, 2000

(87) PCT Pub. No.: WO99/15941

PCT Pub. Date: Apr. 1, 1999

(30) Foreign Application Priority Data

Sep. 19, 1997 (SE) .................................................. 9703399

(51) Int. Cl.[7] ....................................................... G05D 1/00
(52) U.S. Cl. ........................... 318/580; 318/587; 180/167
(58) Field of Search .................................... 318/580, 585, 318/587, 604, 607, 608, 627, 647, 653; 180/167, 168, 169; 56/10.2 R, DIG. 15

(56) References Cited

U.S. PATENT DOCUMENTS

| | | | | |
|---|---|---|---|---|
| 3,698,523 | * | 10/1972 | Bellinger ........................ | 192/12 BA |
| 3,893,536 | * | 7/1975 | Marshall et al. ..................... | 180/98 |
| 3,924,389 | * | 12/1975 | Kita ..................................... | 56/10.2 |
| 4,180,964 | * | 1/1980 | Pansire ................................ | 56/10.2 |
| 4,855,656 | * | 8/1989 | Saitoh et al. ........................ | 318/587 |

FOREIGN PATENT DOCUMENTS

WO 90/00274-A1 * 1/1990 (SE) ................................. G05D/1/02

* cited by examiner

Primary Examiner—Robert E. Nappi
Assistant Examiner—Edgardo San Martin
(74) Attorney, Agent, or Firm—Pearne & Gordon LLP (57) ABSTRACT

An electronic bordering system for a working tool in which a border cable is placed above, under or on ground or floor, so that it separates an inner area within the border cable from an outer area. The working tool is preferably intended for attendance of ground or floor. A signal generator feeds the border cable with current, whose magnetic field affects at least one sensing unit located on the working tool, so that the sensing unit emits signals to a control unit, which in cooperation with an engine control, or a signal system for a driver, and at least one driving source directs the tool's movement in order to prevent it from remoting from the inner area. The signal generator feeds the border cable with current containing at least two alternating-current components of different frequency, and the components are lying in a known relation of time to each other.

13 Claims, 5 Drawing Sheets

ELECTRONIC BORDERING SYSTEM

TECHNICAL FIELD

The subject invention refers to an electronic bordering system for a working tool, in which system a border cable, i.e. an electric cable, is placed above, under or on ground or floor, so that it separates an inner area within the border cable from an outer area, which working tool is preferably intended for attendance of ground or floor, such as grass cutting, moss-scratching, watering, vacuum-cleaning, polishing, transportation etc., and a signal generator feeds the border cable with current, whose magnetic field affects at least one sensing unit located on the working tool, so that the sensing unit emits signals to a control unit, which in cooperation with an engine control, or a signal system for a driver, and at least one driving source directs the tool's movement in order to prevent it from remoting from the inner area.

BACKGROUND OF THE INVENTION

The idea to create a working tool, which manage completely by itself, such as a robot lawn mover or a robot vacuum-cleaner, is old. However, it has taken a long time before such kind of tool has reach the market The solar cell driven lawn mover, called Solar Mower, is an example of that kind of product. It cuts the grass within a border cable, which has been placed in order to fence off the cutting area. Preferably the border cable is excavated into the ground. A signal generator feeds the border cable with current, whose magnetic field affects a sensing unit on the working tool. The sensing unit detects the intensity of the magnetic field and this intensity will increase when the working tool is coming closer and closer to the border cable. The microcomputer in the lawn mover is so programmed that the lawn mover reverses when a certain signal intensity has been achieved during the increasing of the signal intensity that occurs when the sensing unit is approaching the border cable. The lawn mover will as said move backwards from the border cable and then turn and begin to cut in a direction away from the border cable. Consequently, the lawn mover turns when the powerful magnetic field at the border cable has caused a signal intensity of a certain degree. On the other hand, the microcomputer cannot in any way separate the magnetic field on the outside from that on the inside of the border cable. It means that if the lawn mover should slide outside the border cable, or be pushed outside the border cable, the lawn mover will remote from the border cable in the wrong direction, i.e. out from the cutting area. However it stops after approximately 4 metres since the picked up signals then have dropped so much that the machine stops and sends out an alarm signal. Considering the great disadvantage it means to come outside the border cable the lawn mover must therefore change direction already before the sensing unit reaches the border cable. The strength of the signals going from the lawn mover's sensing unit and further into its microcomputer depends on a number of factors, such as spreading of components, sling geometry, excavation depth, iron materials in the ground etc. etc. All this contributes to that a relatively large margin must be given as to how close the sensing unit may come to the border cable, or rather more correctly, at which signal intensity the lawn mover should turn. At cutting work the result will be an uncut edge, which can be several decimetres broad. The problem will be especially large when the cable cannot be placed outside the lawn, for instance at a house ground, an asphalt walk or a flower bed. In case the tool should be pushed outside the border cable by a child or a domestic animal, this will inevitably lead to that the tool stops and sends out an alarm signal, and then it must be lifted in or pushed back inside the border cable.

PURPOSE OF THE INVENTION

The purpose of the subject invention is to substantially reduce the above outlined problems.

SUMMARY OF THE INVENTION

The above purpose is achieved in an electronic bordering system in accordance with the invention having the characteristics appearing from the appended claims.

The electronic bordering system in accordance with the invention is thus essentially characterized in that the signal generator feeds the border cable with current containing at least two components of alternating-current with different frequency, and the components are lying in a known relation of time to each other, e.g. a regularly varying time relation, and hereby the control unit can evaluate the difference in the signals caused by the magnetic field's different directions in the inner area and the outer area, and the control unit can therefore emit an area signal, which mainly takes up one of two states depending on the position of the sensing unit in relation to the border cable, i.e. an outer area state or an inner area state. Accordingly, this means that the tool's microcomputer all the time knows if the tool is on the inside or the outside of the border cable. Hereby the tool can drive past the border cable a bit before it turns. This means, on the one hand that the uncut edge can be eliminated or reduced, and on the other hand that the border cable can be placed at a distance from flower beds, house grounds and asphalt walks. Obviously, this is a very big advantage. The possibility for the control unit to evaluate if the sensing unit is located inside or outside the border cable is created in that the signal generator feeds the border cable with current containing at least two alternating-current components of different frequency, and in that the components are lying in a known relation of time to each other. Furthermore the frequencies can preferably consist of multiples of each other, and preferably the alternating-current components should stay in an essentially permanent time relation to each other. In order to increase the safety of the bordering system preferably an analogue signal is used, a so called quality signal, whose signal intensity is a measure of the intensity of the incoming signals of the control unit. Owing to this the tool can be shut off when the signal intensity is riskfully low. These and other characteristics and advantages of the invention will become more apparent from the detailed description of various embodiments with the support of the annexed drawing.

BRIEF DESCRIPTION OF THE DRAWING

The invention will be described in closer detail in the following by way of various embodiments thereof with reference to the accompanying drawing.

In the lower part of

DESCRIPTION OF PREFERRED EMBODIMENTS

Figure 1:
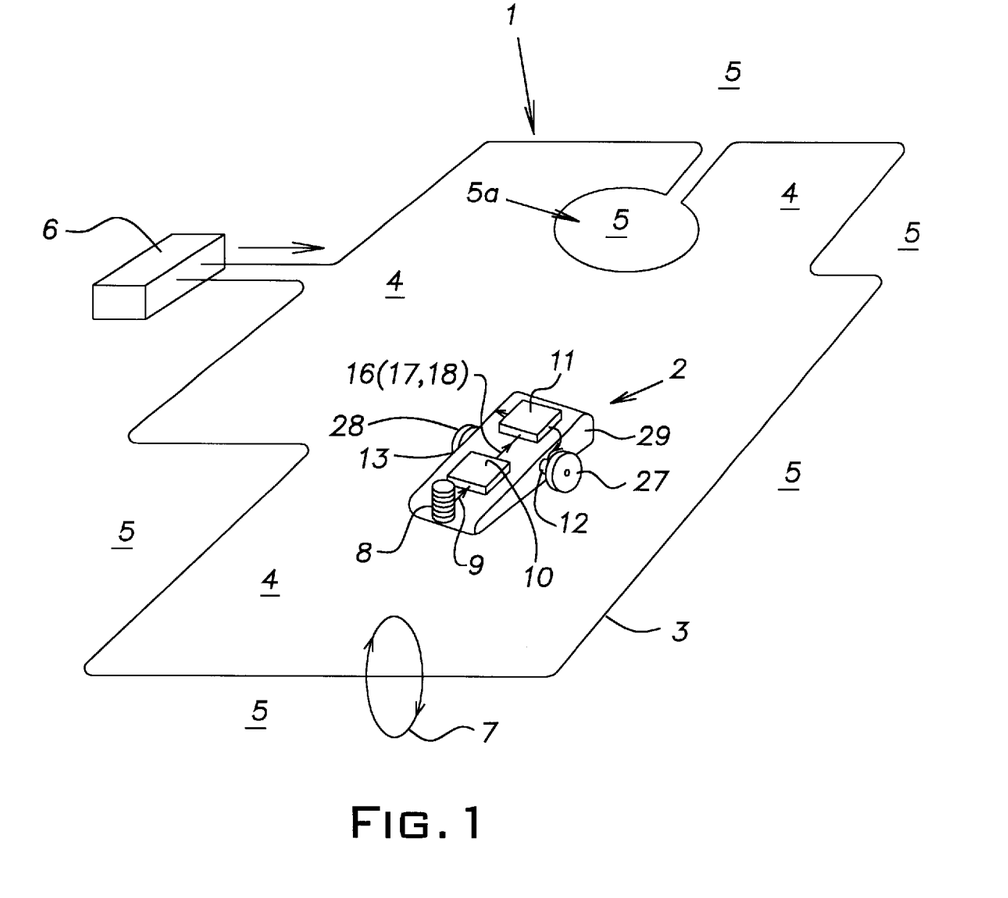
FIG. 1 shows in perspective a working tool, such as a lawn mover, placed on a lawn. By way of a border cable the surface is devided into an inner area as well as an outer area.
Figure 1A:
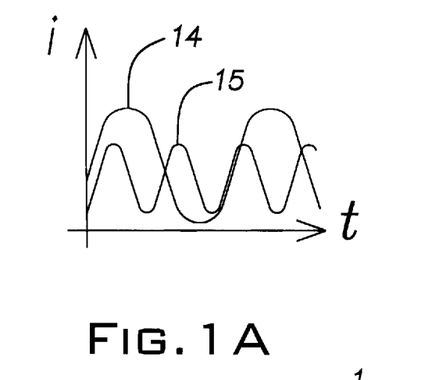
FIG. 1a shows current intensity in the current supplied cable of FIG. 1 as a function of time.

In the schematical FIG. 1 numeral reference 1 designates an electronic bordering system according to the invention. Numeral reference 2 designates a working tool. It is intended to be a lawn mover, which is shown somewhat enlarged, for the sake of clarity. For the same reason only the components which are of interest for the electronic bordering system are shown. The remaining components, such as a knife disc for example, are lying concealed under the tool's cover 29. The border cable 3 is in this case preferably placed a bit under the ground. In other applications, such as a vacuum-cleaner, or a floor-polishing machine, it could be placed on the floor, or above the floor, for example underneath the sealing. The border cable is an electric cable, such as a common copper wire of single-core type, but naturally also double-core type can be used. The border cable 3 is connected to a signal generator 6. The border cable separates an inner area 4 from an outer area 5. The bordering area can have a comparatively arbitrary form. In the upper part of the figure an island 5a is shown as part of the outer area 5. The border cable is thus placed there in order to protrude into the area 4. The island could for instance be a round flower bed. The signal generator feeds the border cable with current generating a magnetic field 7, which is shown here in only one position. FIG. 1a shows the current intensity of the current shown by the arrow of FIG. 1 as a function of time for the components 14 and 15. The current shall contain at least two alternating-current components 14, 15 of different frequency. In the shown example the component 15 has twice as high frequency as the component 14. The amplitudes of the components' current intensity are of different value. The components are superposed a direct current component, which is not advantageous, but still quite possible. The components are lying in a known time relation to each other, in this case a permanent time relation. However, it could also be a regularly varying time relation. On the other hand it cannot be an accidentally varying time relation. The tool 2 rests on three wheels, of which two are rear wheels 27, 28. The front wheel is concealed under the cover 29 and is preferably a free-swinging link wheel. It means that the tool can be controlled in that each drive engine 12, 13 is driven in the suitable direction and with a suitable rotational speed. Naturally the tool could also be designed in other ways, e.g. it could be equipped with one driving wheel and two steering wheels.

Normally the tool is self-propelled, but it is also conceivable that it is propelled by a driver.

Figure 5:
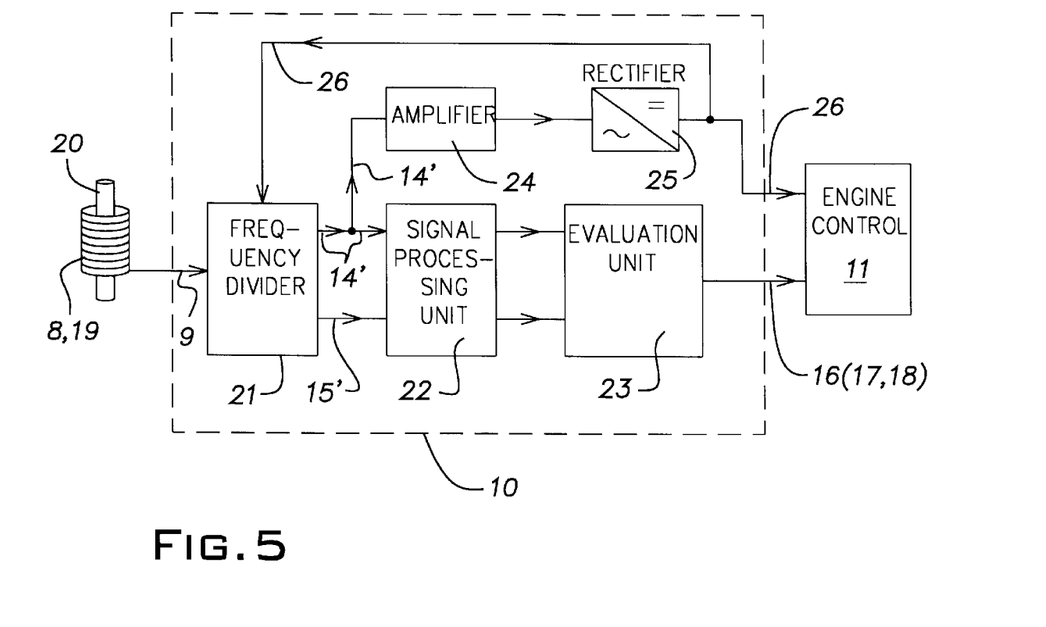
FIG. 5 shows enlarged the control unit 10, which is clearly evident without details from FIG. 1.

The tool is equipped with a sensing unit 8, here located on the one end, i.e. at the very front of the tool. The sensing unit comprises at least one coil 19. Preferably the coil 19 surrounds a ferrite rod 20, which is placed into the middle of the coil. The ferrite rod gives about 10 times amplification. The coil and the ferrite rod are shown in FIG. 5. The magnetic field 7 affects the sensing unit 8 so that it emits signals 9 to a control unit 10. The control unit 10 evaluates the signals 9 and emits an area signal 16 to an engine control 11. From the area signal 16 the engine control knows if the sensing unit is located within the inner area 4 or the outer area 5. The engine control 11 provides the tool's driving engines 12, 13 with current for driving of the tool. Obviously the tool could also be run by an internal combustion engine and in that case it should more likely have at least one steering wheel and one or two synchronicly driven wheels. That is to avoid too frequent adjustments of the rotational speed as well as direction of the tool's driving engine. In the shown case the units 8, 10 and 11 are designed as separate units. But naturally they can be integrated into one or two units differently divided. In reality these units are of course placed under the cover 29. The engine control 11 could be replaced by a signal system for a driver, e.g. the signal system could by way of arrows indicate "turn left", "drive forward", "reverse", "turn right". This applies either in a case with a self-propelled working tool, which is the normal case, or in a case with a driver functioning as the driving source for propelling the tool. An example of a hand-driven tool could be a tool intended for excavating, up or down, of the border cable 3. The control unit 10 could then emit signals in order to show the driver how the tool should be operated to be located above the excavated border cable 3.

Figure 2:
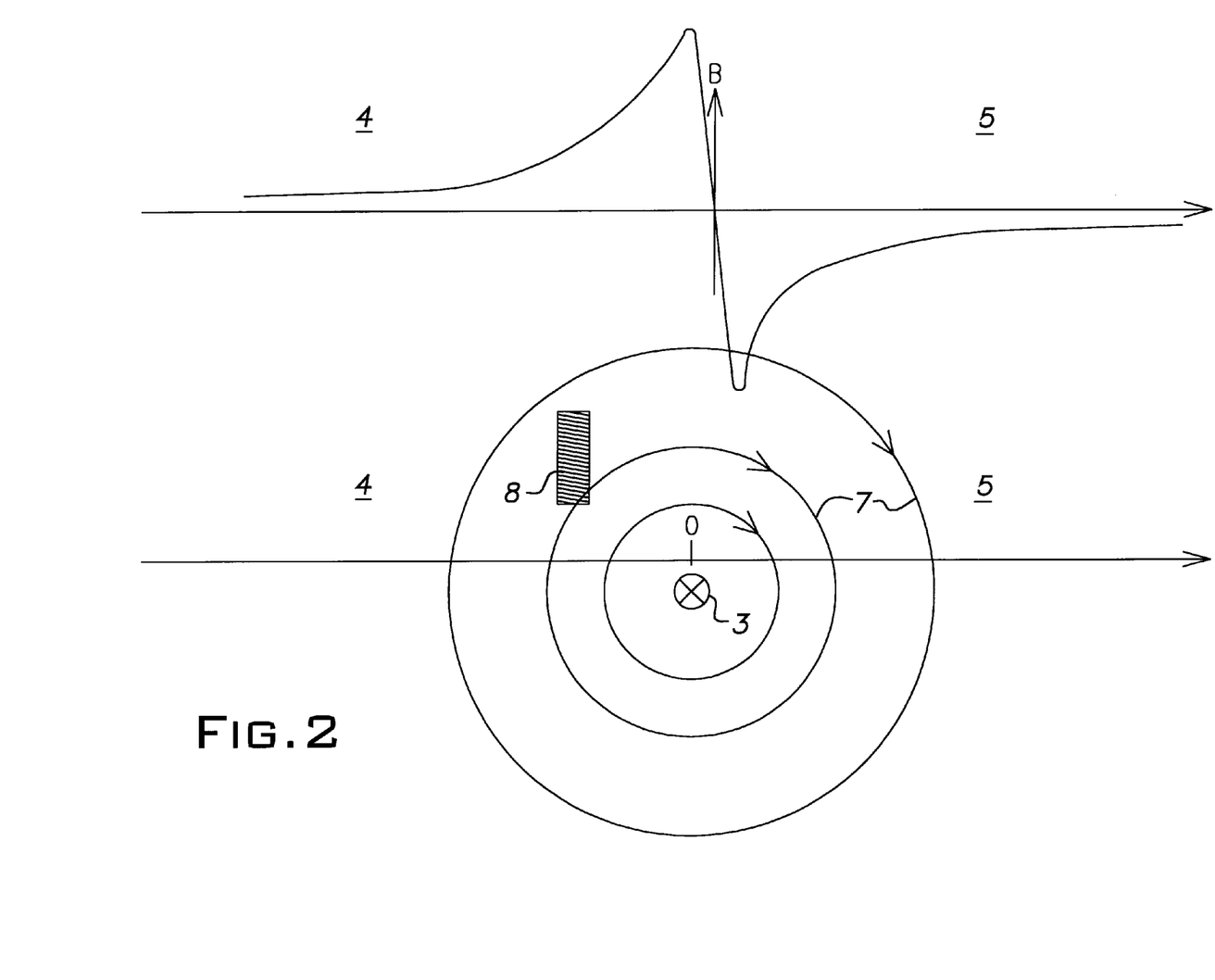
FIG. 2 a ground area is illustrated as a horizontal line. Under the ground area a border cable is placed. The border cable is fed with current which generates a magnetic field. This is illustrated as concentric circles around the cable. In the upper part of the figure the magnetic field intensity, B, is shown, which is caused by the current supplied cable.

In FIG. 2 a sensing unit 8 is shown located a bit above the ground area, i.e. the horizontal line in the lower part of the figure. Also, it is located within the inner area 4 near the current supplied border cable 3. In this situation the magnetic field 7 will pass through the sensing unit 8 from below. As mentioned above, the sensing unit has a coil. Due to the fact that the time variable magnetic field flows through the coil a voltage is generated in the coil's winding wire. However, if the sensing unit should instead be located to the right of the border cable 3 the magnetic field through the coil should then change direction and the related voltage should change sign. The invention is based on a method that makes it possible to identify this difference in the signal direction within the inner area 4 and within the outer area 5. In the upper part of FIG. 5 is shown a related characteristic picture of the magnetic field intensity in the area inside as well as outside the border cable 3. Normally the magnetic field intensity cuts the zero-line just above the border cable 3. However, this can be moved a centimetre or a few centimetres sideways owing to the influence from a magnetic field of an adjacent border cable 3. Obviously it can also be affected by other magnetic fields.

Figure 3:
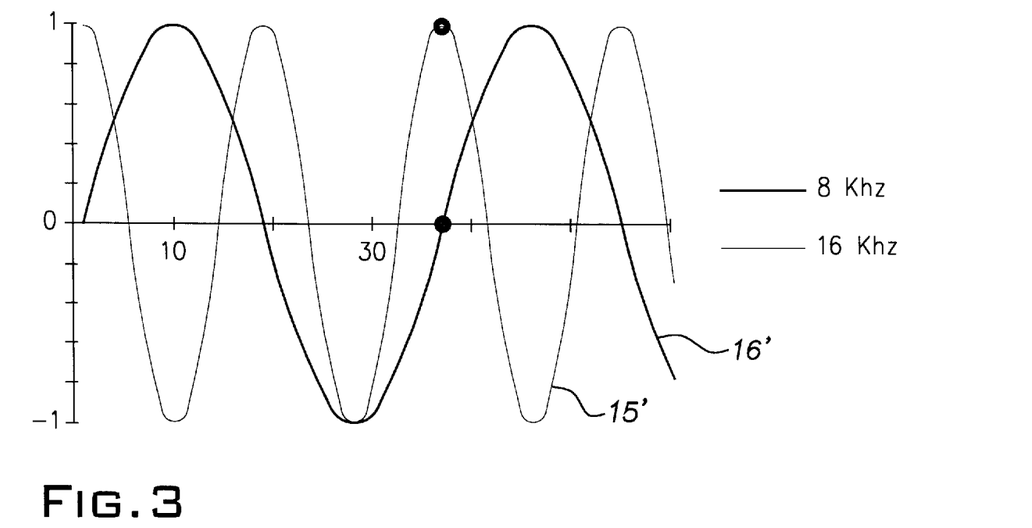
FIG. 3 shows an example of a signal in the sensing unit devided into its frequences when the sensing unit is located in the inner area. On the horizontal axes the time is shown in microseconds and on the vertical ones an amplitude value is given, e.g. for the signal's current intensity.
Figure 4:
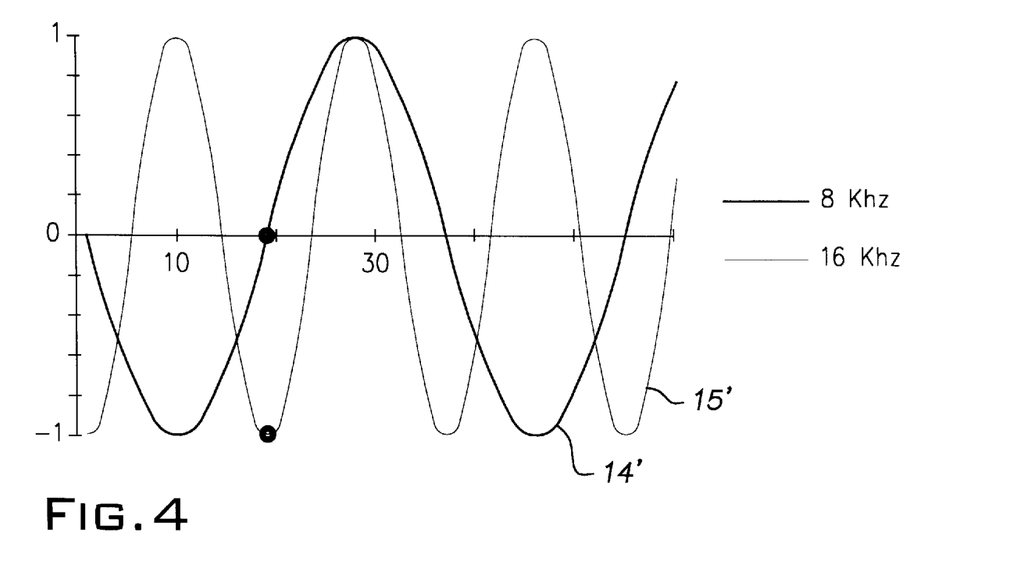
FIG. 4 shows a signal in the sensing unit devided into its frequences when the sensing unit is located in the outer area.

FIG. 3 shows an example of a signal 9 from the sensing unit 8 divided into its frequency signals 14' and 15' when the sensing unit is located in the inner area 4. The lower frequency signal, here 8 Khz, is drawn with stronger lines than the rapid frequency signal, here 16 Khz. Both these frequences are particularly suitable since the larger one is a multiple of the smaller one. The signals 14' and 15' are here sine-waves. These are particularly advantageous considering disturbances of other electronic equipment. The signals 14' and 15' represent the alternating-current components having been fed onto the border cable. Essentially they have the same frequency and curve shape. From an economical point of view it could be preferable that the alternating-current components 14, 15 are composed of square waves. Furthermore, regarding disturbances it would be preferable that the square waves are provided with rounded edges and are thus more similar to sine-waves. As mentioned above it would be especially preferable that the higher frequency is twice as high as the lower one, in this case 16000 Hz. But also other even number multiples would be preferable, such as 4, i.e. 8000 Hz and 32000 Hz. Furthermore ir would also be possible to use odd number multiples, such as 3, i.e. 8000 Hz and 24000 Hz. In the FIGS. 3 and 4 the signals 14' and 15' are lying in a permanent time relation to each other due to the fact that the alternating-current components are lying in an essentially permanent time relation to each other. The horizontal time scale shown in the FIGS. 3 and 4 is stated in microseconds. Be comparing FIG. 3 with FIG. 4 it will become apparent that each signal component 14', 15' respectively is inverted, i.e. reflected around the horizontal axis. The points marked out in each figure show how the alteration of both curves can be used in the control unit in order to evaluate if the sensing unit is located inside or outside the border cable. We follow the slower signal component 14' and make use of the passing through zero of the current value in a positive direction. This gives the point marked on the X-axis at approximately 37 microseconds. By reading the corresponding value of the other signal component 15' a positive value, here at maximum amplitude, is achieved. If the same procedure is followed for the signal components in FIG. 4 each passing through zero in a positive direction for the lower frequency component 14' would instead give a negative value for the signal component 15'. Consequently, here occurs a distinct change when the sensing unit is passing the border cable. Obviously, as mentioned above, the change must not necessarily occur exactly where the border cable is passed by, but can be displaced some few centimetres. However, the change that occurs in the signal components' 14', 15' mutual state at the border cable is very distinct and will be diminutively affected by external conditions, such as components, disturbances etc. Hereby a basis for a safe bordering system is created.

FIG. 5 shows more in detail how the signals from the sensing unit are processed in the control unit 10. It will also become apparent which signals which are forwarded to the engine control 11. For, the purpose of the sensing unit is to detect at least two alternating-current components of different frequency, as mentioned by the examples of 8 kHz and 16 kHz. It means that the coil 19 should have a resonance frequency lying in proximity to at least one of the frequences of the alternating-current components. Preferably a resonance frequency lying between the frequences of the components 14', 15' is choosen. In a test a coil with a copper wire around a ferrite core was used, and in sequence with the coil a capacitor was connected. Both components constitute a resonance circuit of approximately 11 kHz resonance frequency and a factor of merit, or Q-factor, of approximately 1,2. Thanks to the low factor of merit the coil is widebanded, which is necessary for both frequences to come through. No trimming of the coil is required. Consequently, from the sensing unit a signal 9 is forwarded to the control unit 10. Initially the signal reaches a frequency divider 21, where it will be divided into at least two signal components 14', 15' with different frequency corresponding to the frequences of the alternating-current components 14, 15. After possible processing in a signal processing unit 22 the signal components are forwarded to an evaluation unit 23. The signal processing unit is used in order to give the signal components 14', 15' a more definite square form, and the need for this signal processing depends on the design of the evaluation unit 23. An example of an evaluation unit is a so called latch, which has a clock input and a data-in input. In this case the signal with the lower frequency 14' is connected to the clock input. This also relates to the example in FIG. 3 and 4. It means that when the 8 kHz makes a positive pass through zero the signal component 15' will be released from the data-in input and go on to the data-out output and be kept fixed until a change occurs. This function is named "sample and hold". In the example according to FIG. 3 the result will be that the outgoing area signal gets a positive value in the area inside the border cable, while it gets a negative value in the area outside the border cable according to FIG. 4. Consequently, in this manner an area signal 16 is created, which takes up one of two distinct states, i.e. an outer area state 17 or an inner area state 18. The above description is somewhat simply relating the basic function of the control unit 10 in one preferred embodiment.

Figure 6:
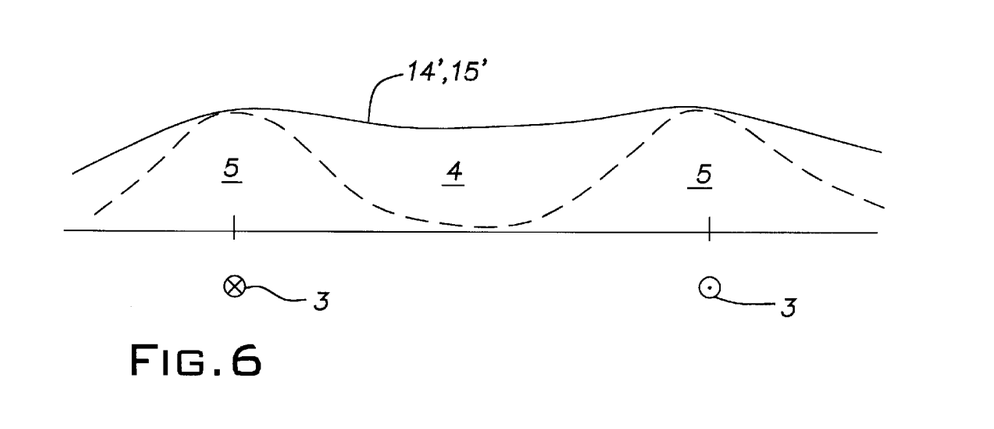
FIG. 6 shows the ground area as a horizontal line. The inner area is separated by a current supplied border cable. Above this the resulting signal intensity of the control unit is shown in two versions. A continuous-line illustrates the signal intensity when an automatically controlled amplifier according to FIG. 5 is used. A dash-dotted line illustrates the signal intensity when such an amplifier circuit is not used. The picture is simplified by showing only the absolute value of the signal intensity and it is not showing the extremely local fall of the signal intensity straight above each section of the border cable.

Furthermore, in the frequency divider 21 an amplification of the signal takes place, preferably in two resonance circuits, which i.a. consist of two trimable coils. During the amplification a certain degree of phase shift of each signal frequency can occur. This could mean that the signal frequences will not stay in the desirable permanent time relation to each other. Therefore, in the signal processing unit 22 an adjusting phase shift of each signal can be made, so that the desirable time relation between the signals is maintained. How much amplification the signal components 14', 15' need is varying depending on how far from the border cable the tool is located. It is therefore preferable to create a variable amplification, which is highest when the tool is located far from the border cable and lowest when the tool is located near the border cable. This is achieved in that one of the signal components, here 14', is forwarded to an amplifier 24, and after rectifying in rectifier 25 the analogue signal 26 is brought back to the frequency divider 21, which also has a variable amplification. Compared with not having this special amplification circuit the signal 26 affects the variable amplification of the signals 14', 15', so that a considerably more constant signal intensity of these signals is achieved inside and close outside the inner area 4. The described circuit serves as an amplifier with automatic gain control (AGC). In this circuit it is preferable that the amplifier 24 has non-linear amplifying so that its amplification can be non-linearly affected by the ingoing signal's intensity. In FIG. 6 is shown that the signal intensity of the signals 14' and 15' according to the continuous-line varies very little within the inner area 4 and falls slowly out from the border cable in the outer area 5. If this special amplification solution should not have been used, the signal intensity of the signals 14', 15' would instead follow the dash-dotted line, which of course is much more disadvantageous.

In the middle of area 4 the relation between the signal intensities is such that the signal intensities according to the continuous-line are approximately 100 times stronger than those according to the dash-dotted line.

It is important that the tool shuts off itself in case of too low signal intensity. Since the evaluation unit 23 operates in a "digital" way this will not function automatically. Therefore a special quality signal 26 is created. In the shown example it is the same signal which is used in the amplification circuit. The analogue quality signal 26 has a signal intensity that is the measure of the intensity of the ingoing signals 9 to the control unit, so that the tool can be shut-off at a too low quality signal, i.e. too low signal intensity. The quality signal could also have been picked up directly from the ingoing signals 9 and then been rectified.

In another embodiment of the control unit 10 the picked up signals 9 from the sensing unit 8 can be analysed by way of a special software, so that signals from the inner area 4 can be separated from signals from the outer area 5. Also in this case the supplied current in the border cable must contain at least two alternating-current components of different frequency having a known time relaltion. On the other hand the signals 9 must not be divided into signal components in a frequency divider 21. The "sum signal" can be analysed directly, preferably after a certain amplification is made. In this case the control unit 10 is relatively similar to the control unit shown in FIG. 5. As described earlier the signals 9 are amplified in the unit 21 but must not be divided into signal components 14', 15'. The best way to illustrate this is simply to cancel the signal 15' between the units 21 and 22 as well as the corresponding signal between the units 22 and 23 in FIG. 5. The evaluation unit represents a microcomputer, or form part of a larger microcomputer, provided with a special software in order to analyse the incoming signals 14', which are amplified signals 9. For the analysis an analogue-digital-converter is used. By comparing the signal with stored data the evaluation unit can determine if the sensing unit 8 is located in the inner area 4 or the outer area 5. Owing to the special current emitted to the border cable the signals from the inner area can be separated from the signals from the outer area Preferably a digital signal processor (DSP) is used for this purpose. The units 22, 23, 24 and 25 could be parts in a DSP-unit. This DSP-unit could also be integrated in the unit 11.

Figure 7:
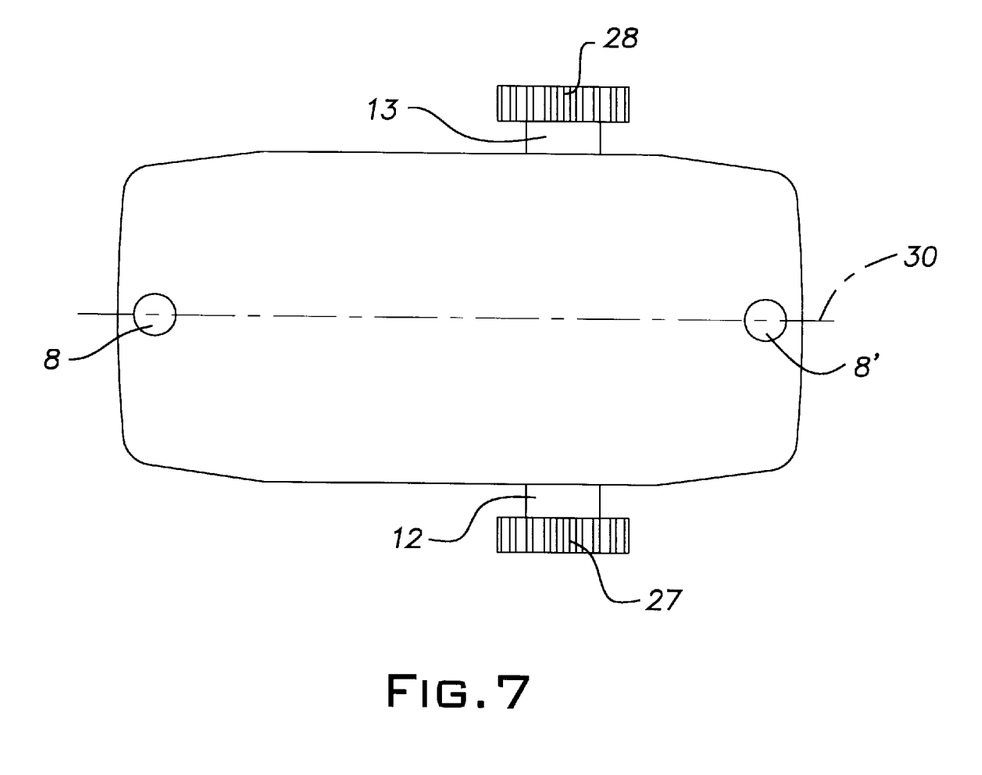
FIG. 7 shows somewhat simplified the working tool in FIG. 1 seen from above. In this case the working tool has two sensing units instead of only one.

FIG. 7 shows a working tool provided with two sensing units 8, 8' instead of only one. The sensing units are placed in the middle of the tool, i.e. on the longitudinal centre line 30. This lateral symmetry is important for the tool to be able to work in the same way, either if it is approaching the border cable obliquely inwards from one or the other side. In practice it has turned out that it is preferable to let the sensing unit 8 pass the border cable by approximately half the breadth of the tool, i.e. about 3 dm for the cutter, before the tool changes direction. By using two sensing units a lot of possibilities of improvements in many different ways are created. Another variant is to connect the sensing units alternately so that one is connected at driving forwards and the other at driving backwards. Thus it becomes possible to avoid that the tool have to make lots of turnings which are necessary for keeping the sensing unit in a certain position all the time, for instance at the very front. By avoiding these turnings both time and energy can be saved. Then the natural thing would be to place the wheels in the middle of the tool seen in its longitudinal direction, and moreover that the tool is symmetrically designed, since in a proper sense there is neither front nor rear on it. Also, it might be possible to use the two sensing units at the same time. This variant could imply more information when the tool is located near the border cable, e.g. by comparing the signal intensities of the two sensing units it would be possible to see from which angle the tool is approaching the border cable. This might even lead to a more effective control of the tool's working. Another conceivable solution would be to design one of the sensing units for one of the frequences, e.g. to catch up those alternating-current component with the low frequency, and to design the other sensing unit for the other frequency. Hereby the amplification in each sensing unit could increase and thus the demand for amplification later on in the signal chain would decrease.

What is claimed is:

1. An electronic bordering system (1) for a working tool (2), in which system a border cable (3) is placed above, under or on ground or floor, so that it separates an inner area (4) within the border cable (3) from an outer area (5), which working tool is preferably intended for attendance of ground or floor and a signal generator (6) feeds the border cable with current, whose magnetic field (7) affects at least one sensing unit (8,8') located on the working tool (2), so that the sensing unit (8,8') emits signals (9) to a control unit (10), which in cooperation with an engine control (11), or a signal system for a driver, and at least one driving source (12, 13) directs the tool's movement in order to prevent it from remoting from the inner area (4), characterized in that the signal generator feeds the border cable with current containing at least two components (14, 15) of alternating-current with different frequency, and the components (14, 15) are lying in a known time relation to each other and hereby the control unit can evaluate the difference in the signals (9) caused by the magnetic field's different directions in the inner area (4) and the outer area (5), and the control unit can therefore emit an area signal (16), which mainly takes up one of two states depending on the position of the sensing unit (8) in relation to the border cable.

2. An electronic bordering system (1) according to claim 1, characterized in that the two alternating-current components' (14, 15) frequences are multiples of each other.

3. An electronic bordering system (1) according to claim 2, characterized in that the two alternating-current components' (14, 15) frequences and even number multiples of each other.

4. An electronic bordering system (1) according to any one of the preceding claims, characterized in that the alternating-current components (14, 15) are lying in an essentially permanent or fixed time relation to each other.

5. An electronic bordering system (1) according to any one of claims 1–3, characterized in that the alternating-current components are composed of square waves.

6. An electronic bordering system (1) according to claim 5, characterized in that the square waves are provided with rounded edges.

7. An electronic bordering system (1) according to any one of claims 1–3, characterized in that each sensing unit comprises at least one coil (19).

8. An electronic bordering system (1) according to claim 7, characterized in that the coil (19) surrounds a ferrite rod (20, which is placed into the middle of the coil.

9. An electronic bordering system (1) in accordance with claim 7, characterized in that the coil (19) has a resonance frequency lying in proximity to at least one of the frequences of the alternating-current components (14, 15).

10. An electronic bordering system (1) according to claim 9, characterized in that the coil (19) has a resonance frequency lying between the frequences of the alternating-current components (14, 15).

11. An electronic bordering system (1) according to any one of claims 1–3, characterized in that the control unit (10) evaluates the signals (9) by dividing them in a frequency divider (21) into signal components (14', 15') with different frequency corresponding to the frequences of the signal components (14, 15), and the signal components are forwarded, after possible processing in a signal processing unit (22), to an evaluation unit (23) and the evaluation unit creates the area signal (16).

12. An electronic bordering system (1) according to claim 11, characterized in that one of the signals (9, 14', 15') is rectified in a rectifier (25) and forwarded to the engine control (11) as an analogue signal, a so called quality signal (26), whose signal intensity is the measure of the intensity of the ingoing signals (9) to the control unit, so that the tool can be shut-off at a too low quality signal.

13. An electronic bordering system (1) according to claim 11, characterized in that one of the signal components (14', 15') are forwarded to an amplifier (24), whose amplification thus is affected by the ingoing signals' (14', 15') intensity, and after rectifying in rectifier (25) the analogue signal (26) is brought back to the frequency divider (21), which also has a variable amplification, and compared with not having this special amplification circuit the signal (26) affects the variable amplification of the signals (14', 15'), so that a considerably more constant signal intensity in these signals (14', 15') is achieved inside and near outside the inner area (4).

* * * * *

UNITED STATES PATENT AND TRADEMARK OFFICE
CERTIFICATE OF CORRECTION

PATENT NO.   : 6,300,737 B1
DATED        : October 9, 2001
INVENTOR(S)  : Bergvall et al.

It is certified that error appears in the above-identified patent and that said Letters Patent is hereby corrected as shown below:

<u>Column 8,</u>
Line 33, please delete "and" and insert -- are --.

Signed and Sealed this

Thirteenth Day of August, 2002

Attest:

Attesting Officer

JAMES E. ROGAN
*Director of the United States Patent and Trademark Office*

UNITED STATES PATENT AND TRADEMARK OFFICE
CERTIFICATE OF CORRECTION

PATENT NO.    : 6,300,737 B1
DATED         : October 9, 2001
INVENTOR(S)   : Bergvall et al.

It is certified that error appears in the above-identified patent and that said Letters Patent is hereby corrected as shown below:

<u>Title page,</u>
Item [56], References Cited,
U.S. PATENT DOCUMENTS, please insert the following references:
-- 3,550,714    12/1970    Spencer Lawrence Bellinger
   4,079,801    3/1978     Dobson --

FOREIGN PATENT DOCUMENTS, please insert the following references:
-- 2 696 569    4/1994     France
   0 774 702 A2  5/1997    Europe --

Signed and Sealed this

Third Day of December, 2002

JAMES E. ROGAN
*Director of the United States Patent and Trademark Office*